(No Model.)
3 Sheets—Sheet 1.
H. BLACK.
HARVESTING MACHINE.
No. 347,285. Patented Aug. 10, 1886.
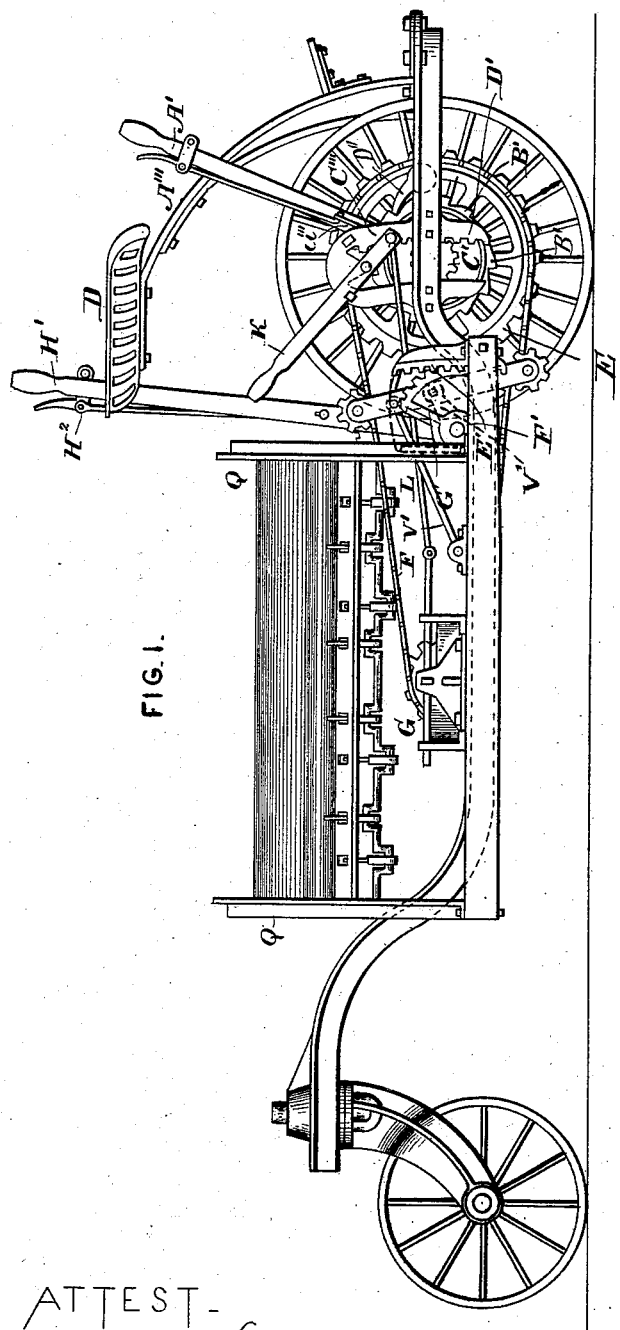
FIG. 1.
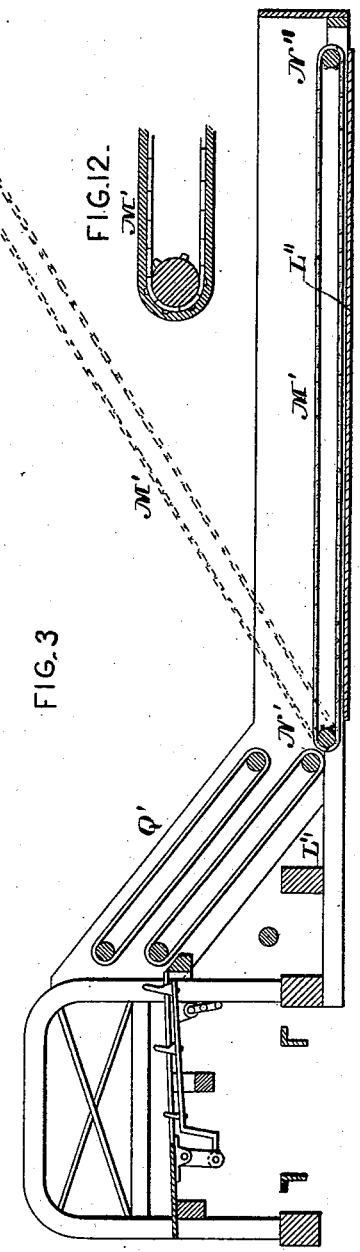
FIG. 12.
FIG. 3.
ATTEST:
J. Henry Kaiser
Harry L. Amer
INVENTOR:
Henry Black
By Wm. C. McIntire,
att'y
N. PETERS, Photo-Lithographer, Washington, D. C.

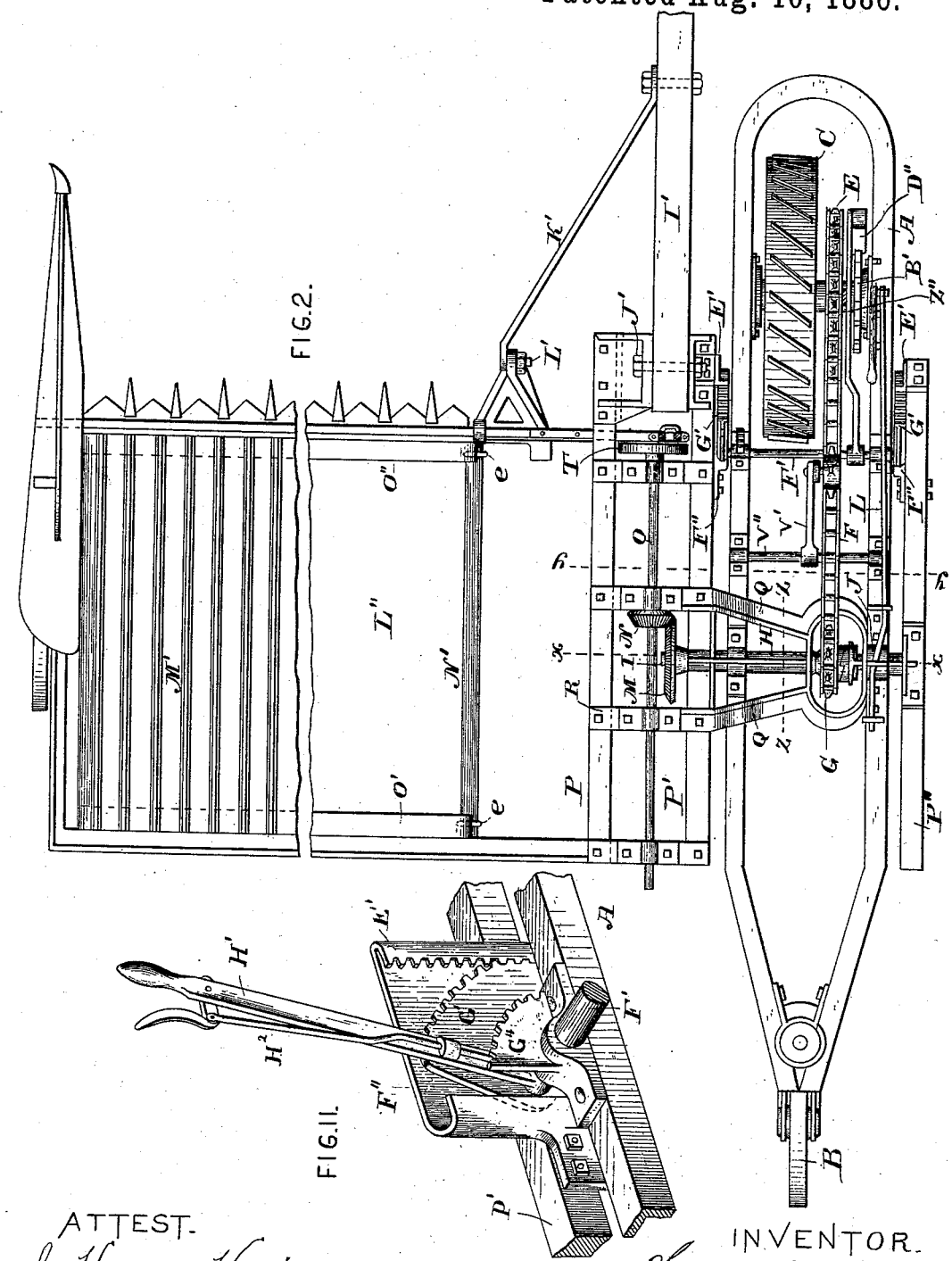

(No Model.) 3 Sheets—Sheet 3.
H. BLACK.
HARVESTING MACHINE.
No. 347,285. Patented Aug. 10, 1886.
FIG. 4.
FIG. 5.
FIG. 6.
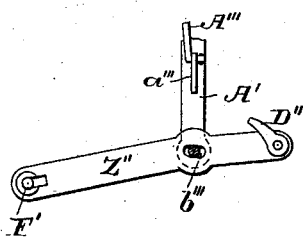
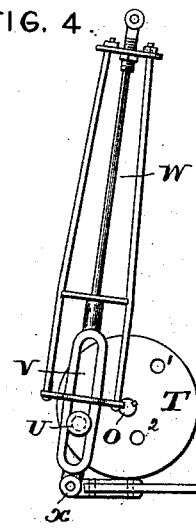
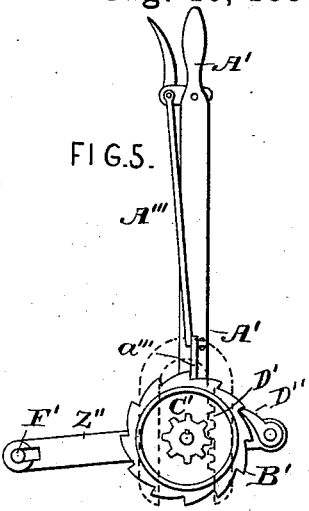
FIG. 7.
FIG. 8.
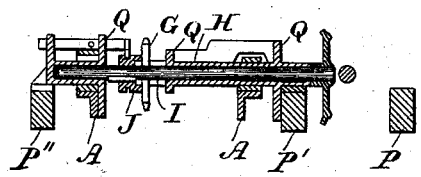
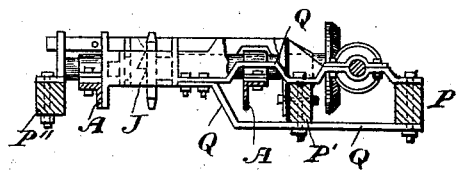
FIG. 9.
FIG. 10.
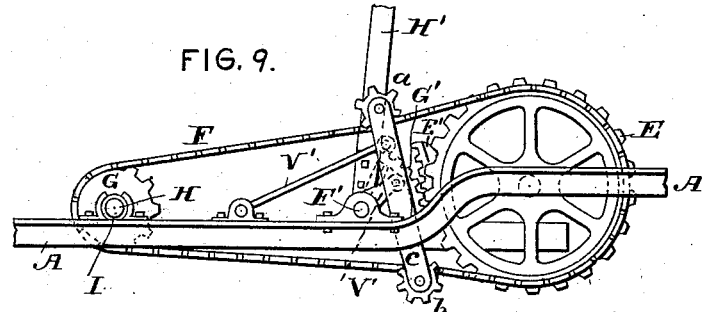
ATTEST.
J. Henry Kaiser
Harry L. Amer.
Henry Black
INVENTOR.
By
Wm. C. McIntire
Atty.
N. PETERS, Photo-Lithographer, Washington, D. C.

UNITED STATES PATENT OFFICE.

HENRY BLACK, OF GREENVILLE, OHIO, ASSIGNOR OF SIXTY-FIVE ONE-HUNDREDTHS TO JOHN R. KNOX, JOHN H. MARTIN, E. B. HUSSEY, JAMISON & MARTZ, AND ALLEN T. MILLER, ALL OF SAME PLACE.

HARVESTING-MACHINE.

SPECIFICATION forming part of Letters Patent No. 347,285, dated August 10, 1886.

Application filed August 17, 1885. Serial No. 174,666. (No model.)

*To all whom it may concern:*

Be it known that I, HENRY BLACK, a citizen of the United States, residing at Greenville, in the county of Darke and State of Ohio, have invented a new and useful Harvesting-Machine, of which the following is a specification.

My invention relates to certain novel features of construction in harvesting-machines, and particularly to that class known as "low-down" harvesters.

My invention has for its object to lessen the weight and draft of the machine, and also to provide a novel means of connection between the cutter-bar and the line-shaft, to secure an easy and comparatively noiseless movement of the knife from the moment it starts, as well as after the acquirement of momentum, and to prevent all likelihood of the choking of the said knife.

My invention also has for its object to provide a novel mechanism for easily and successfully tilting the machine to secure the taking up of "down grain," and moving over obstructions, and making the point of oscillation of the machine, practically at the center, to avoid the necessity of lifting or depressing any undue amount of weight.

My invention also has for its object to so construct the tilting mechanism that it shall also serve to strengthen the frame and serve as a guard against the twisting or straining of the same.

With these ends in view my invention consists, first, in mounting on the end of the line-shaft an ordinary wheel provided with a wrist-pin, and connecting it with the knife by a wood or metal extension having a hinge or pivotal connection to the lower end of an oscillator hung from a suitable point above, pendulum like, and forming the lower end of this oscillator with a slot or race, through which the wrist-pin on the wheel passes, as will be hereinafter and in detail explained; second, in the construction and arrangement of mechanism by which the pivotal or tilting point of the machine is made about coincident with the axis of the drive-shaft, or centrally of the weight of the platform; third, the construction and arrangement of the devices for maintaining the tilting frame against any twisting movement or thrust; fourth, in the novel details of construction and arrangement of parts necessarily brought into co-operation in carrying out the purpose of my invention, as will be hereinafter fully described, and specifically claimed.

In order that those skilled in the construction and operation of harvesting-machines may know how to make and use my invention, I will proceed to describe the construction and operation of the same, referring by letters to the accompanying drawings, in which—

Figure 1 is a stubble-side elevation of a harvesting-machine embodying my invention; Fig. 2, a plan or top view of the same; Fig. 3, a detail longitudinal section showing the relation of the canvas conveyer to a suitable binder mechanism, and illustrating the means for causing the canvas to travel and the manner in which the belt-frame of the platform is mounted in order that all obstructions may be removed from under it. Fig. 4 is a front elevation of the oscillator, showing its pivotal connection with the extension-bar from the knife. Fig. 5 is an elevation showing the lever, ratchet-wheel pinion, and connections for raising the main frame of the machine; Fig. 6, a detail view of the bar to which the ratchet shown in Fig. 5 is connected, and by which it is held through the medium of a dog; Fig. 7, a detail section taken at the line $x\ x$, Fig. 2, showing the construction and arrangement of the shaft upon which the frame is tilted; Fig. 8, a similar section at the line $y\ y$, Fig. 1, showing the bracing; Fig. 9, a detail plan view showing the connection between the "bull" or driving wheel and the manner of transmitting motion to the driving-shaft; and Fig. 10 is a cross-section at $z\ z$, Fig. 1, showing the drive-shaft in its housing. Fig. 11 represents a detached view in perspective of one of the segments with its rack and supporting-guides forming part of the mechanism for elevating and depressing the harvester-frame, also showing the devices employed for holding such frame to the positions to which it may be brought. Fig. 12 is a detail view.

Similar letters indicate like parts in the several figures.

A represents the main-wheel frame proper, which is made of angle-iron to secure strength and lightness. The forward end is bent in the form of a half-circle, and the rear end is V-shaped and forms the bearing for the caster-wheel B. The main driving-wheel or bull-gear C is mounted in journals fixed to the frame A and slightly in advance of the driver's seat D, which is mounted in the usual manner upon the frame.

Fixed to the axle of the main wheel A is a sprocket-wheel, E, over which is arranged a drive-chain, F, which passes over the smaller sprocket-wheel, G, loosely mounted upon a shaft, I, inclosed in the tubular bearing-sleeve H, which is mounted in the main frame A in a plane about central of the tilting harvester-frame hereinafter described.

The harvester-frame is represented by the three parallel bars P P' P'', the latter being on the outside of the main-wheel frame A. P'' and P' of the tilting harvester-frame are suitably connected by a raised or arched connection, and on said connection may be mounted any desired grain-binder, and a pillar or other suitable connection to which is pivoted the pendulum shown at Fig. 4. The harvester-tilting frame P P' P'' is pivotally connected with the main-wheel frame A by means of the iron yoke-frame Q, (see Figs. 2 and 8,) and this frame, as will be seen at Fig. 2, surrounds the tubular shaft and forms by its peculiar construction a space for the sprocket-wheel G. This yoke-frame Q, where it passes over the inside portion of the frame A, is arched sufficiently, as will be seen by reference to Fig. 8, to leave room for the necessary pivotal or tilting movement of the harvester-frame.

Arranged within the tubular shaft H is the driving-shaft I, and the sprocket-gear G is mounted loosely thereon. A sliding clutch, J, is feathered to the shaft I and operated in an obvious manner by the hand-lever K and connecting sliding bar L, so that the shaft I is caused to rotate or remain stationary, accordingly as the clutch is either in or out of connection with the sprocket-gear G, as most clearly illustrated at Fig. 7. The inner end of the shaft I is provided with a bevel-gear, M, meshing with a bevel-pinion, N, on a transverse shaft, O, mounted in suitable bearings on the harvester-frame, and thus power and motion are transmitted through the sprocket-gears E G and drive-chain F to the shaft O.

On the front end of the shaft O is secured a crank-plate, T, (see Figs. 2 and 4,) having a crank or wrist-pin, U, adapted to be fixed at varying distances from the axis of motion of the crank-plate T, and for which purpose I provide a series of holes, 1 2, &c. This wrist-pin is adapted to move within the slot or race V in the lower end of the pendulum W, (see Figs. 2 and 4,) and the lower extremity of the pendulum is connected by a pivotal or hinge joint, $x$, and adjustable extension-bar Y to the knife-bar Z. The upper end of the pendulum W is pivotally connected to a suitable pillar or frame mounted upon the tilting harvester-frame. By this construction and arrangement I am enabled to secure a comparatively noiseless movement of the knife, and decrease to the minimum the liability of the choking of the same, as it will be observed that the power is so applied that the knife moves with the same ease at the start as during any other time.

The front end of the main-wheel frame A is raised and lowerd by means of the hand-lever A', ratchet-wheel B', sleeved on the axle and having integral therewith the pinion C', together with rack D' and a pawl, D'', on the wheel-frame, (see Figs. 1, 5, and 6,) in the usual manner in this class of machines, and when the front end of the main-wheel frame A has been so lifted or raised the harvester tilting frame P P' P'' is tilted in the following manner. On the forward ends of the portions P' P'' of the frame are secured what I term "rack-standards" E', which are securely bolted in place, and mounted in and across the main-wheel frame A is a rock-shaft, F', the ends of which project beyond the sides of the wheel-frame A, and keyed to said ends are two segmental gears, G', which mesh with the racks E', the rear faces of the hubs of said gears being supported by supporting-guides F'', securely bolted to the portions P' P'' of the tilting frame, as shown in Figs. 2 and 11 of the drawings. The devices or mechanism for maintaining the forward end of the main frame A at the positions to which it may be brought consists of an arm, Z'', loosely held on the rock-shaft F', and having pivoted to its free or forward end a pawl, D'', which engages the ratchet-wheel B', secured to or integral with the pinion C', and it is apparent that the same will act to accomplish the end sought. The hand-lever A' is provided with a rod, A''', carrying at its lower end a pawl, $a'''$, which is made to engage the teeth of the ratchet-wheel B' by suitable operation. The shaft of the main wheel passes through an opening, $b'''$, in the arm Z'', (see Fig. 6,) and the hand-lever A' is loosely supported on said shaft, and it will now appear that when the rod A''' is operated to cause its pawl to engage the ratchet-wheel, and the hand-lever A' drawn backward, the pinion C' will raise the rack C''' and the forward end of the main frame, the pawl D'' sustaining it in an obvious manner. When it is desired to lower the forward end of the main frame the lever A' is drawn slightly backward to relieve the pawl D'' of the weight of the frame, and such pawl is then swung backward by suitable movement of the foot, whereupon the frame will be allowed to descend to the extend desired, the pawl D'' then being turned back to again hold it. The rock-shaft F' is operated by a hand-lever, H', which is in easy reach of the driver, and as said lever is pushed forward the segments G', meshing in the racks E', force the latter downward, and as they are fast to the front end of the harvester-frame it follows that said end is correspondingly tilted toward the ground, a reverse movement of said lever reversing the movement of the frame, and it will be observed that the segmental gears, by reason of the arrangement on the shaft F' and the supporting-guides F''', serve as positive braces to secure the harvester-frame against any twisting tendency.

H² indicates a locking-rod by which the parts may be secured in any desired position, and by referring to Fig. 11 will be seen the manner in which this is effected.

Formed with one of the bearings for the shaft F' is a segmental toothed rack, G⁴, into which the end of auxiliary locking-rod H² is engaged when the frame has been brought to the position desired.

I' is the tongue of the machine, which is pivoted to the tilting frame by a suitable bolt-connection, J', and with a stay-rod, K', pivotally bolted at L' to a suitable clip secured to the forward edge of the platform L', from which construction it will be seen that no weight whatever, except that of the tongue itself, is imposed upon the horses.

M' represents the canvas conveyer of the receiving-platform, which is arranged over and around the frame composed of the two rollers N' N'', which are held apart and in parallelism by the side bars, O' O''. These side bars are secured to inner roller, N', by straps or staples $e\ e$, in order that they may vibrate upon the roller N' as a center of motion and be lifted up bodily, as represented in dotted lines at Fig. 3, thus exposing the platform L'', which may be readily cleaned of any and all obstructions, and in order that the canvas conveyer may be made to travel positively and at a uniform rate of speed with the impelling-roller N', I provide the said canvas at one or both edges and on the inside surface with a continuous small-size drive chain, as illustrated at Fig. 3, and the roller N' with a small sprocket-wheel adapted to grasp said chain to operate the belt. The roller N' is of course driven, through the medium of a drive-chain and sprocket-wheel, or in any other suitable manner, from the main wheel C; and any suitable conveying mechanism, such as seen at Q', and binding mechanism may be placed upon the machine; but as they form no part of my present invention, I have only shown in brief so much thereof as is necessary to illustrate the relation of parts.

Such parts of the machine as are shown and not described are intended to represent the general arrangement of a complete machine adapted for the employment of the features of construction forming the subject-matter of the claims hereinafter made.

At Fig. 9 I have shown a drive-chain tightener consisting of a vibrating bar, $c$, provided at each end with sprocket-wheels $a\ b$. The vibrating bar $c$ is pivoted at near each end to the extremity of suitable arms, V'. It is evident from this construction and arrangement that as the main frame is raised or lowered the arms V' will conform thereto, and thus will the sprocket wheels or pulleys $a$ and $b$ be caused to always maintain a uniform tightness upon the main sprocket-belt for a similar purpose.

I do not wish to be confined to the specific details of construction shown and described, as they may of course be somewhat varied without departing from the spirit of my invention; but

What I claim as new, and desire to secure by Letters Patent, is—

1. The combination, with the main-wheel frame and tilting harvester-frame, of the shaft I, and the tubular box H, mounted in the wheel-frame and arranged centrally of the weight of the harvester-frame, the yoke-frame Q, secured to the harvester-frame, and inclosing the shaft I, and forming the connection between the said main wheel and harvester frames, and means for elevating or depressing the forward end of the main frame, consisting of the hand-lever, the arm Z'', rack D', pinion C', and pawl D'', operating in conjunction with the ratchet B', as shown and set forth.

2. The main-wheel frame A and harvester-frame P P' P'', connected through the medium of the pivotal connection H I, in combination with the sprocket-wheels E G, drive-chain F, line-shaft O, bevel-gears M N, pendulum W, connecting-plate Y, and knife-bar Z, substantially as and for the purpose set forth.

3. In combination with the main-wheel frame A and tilting harvester-frame P P' P'', pivotally connected, as described, and with the gears E G and drive chain F, the sliding clutch J and suitable mechanism within reach of the driver for operating the same, substantially as and for the purpose described.

4. The combination, with the main wheel-frame A and the tilting harvester-frame, pivotally connected, as described, of the rock-shaft F', segmental gears G', and racks E', the guides F''', arranged on the tilting frame, and the hand-lever H', the rod H², and segmental racks G⁴, all arranged substantially as shown, and for the purposes set forth.

5. The combination, with the main-wheel frame, the harvester-frame and its rock-shaft, of the segmental gears G', racks E', and guides F''', in the latter of which the rear edge of the segment works, whereby it is held in place and caused to intermesh with the rack, substantially as specified.

In witness whereof I have hereunto set my hand this 8th day of March, 1886.

HENRY BLACK.

Witnesses:
 JNO. H. MARTIN,
 A. E. MILLER.